US009442345B2

(12) United States Patent
Okura et al.

(10) Patent No.: US 9,442,345 B2
(45) Date of Patent: Sep. 13, 2016

(54) CAMERA HAVING A DISPLAY MEMBER

(71) Applicant: CANON KABUSHIKI KAISHA, Tokyo (JP)

(72) Inventors: Yukinobu Okura, Tokyo (JP); Kosuke Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/881,296

(22) Filed: Oct. 13, 2015

(65) Prior Publication Data

US 2016/0116823 A1  Apr. 28, 2016

(30) Foreign Application Priority Data

Oct. 22, 2014 (JP) .................................. 2014-215080
Oct. 22, 2014 (JP) .................................. 2014-215225

(51) Int. Cl.
*G03B 13/02* (2006.01)
*G02B 17/04* (2006.01)

(52) U.S. Cl.
CPC ............... *G03B 13/02* (2013.01); *G02B 17/04* (2013.01)

(58) Field of Classification Search
CPC ...... G03B 13/02; G03B 13/18; G03B 13/24; G02B 17/04
See application file for complete search history.

(56) References Cited

U.S. PATENT DOCUMENTS

| 6,714,244 | B1* | 3/2004 | Takebayashi | .......... | G03B 13/24 |
| | | | | | 340/691.1 |
| 7,548,688 | B2 | 6/2009 | Haraguchi | | |
| 2003/0165334 | A1* | 9/2003 | Becker | .................. | G03B 17/20 |
| | | | | | 396/84 |
| 2004/0160579 | A1* | 8/2004 | Kaneko | .................. | G03B 17/20 |
| | | | | | 353/81 |
| 2005/0265706 | A1 | 12/2005 | Haraguchi | | |
| 2010/0097564 | A1* | 4/2010 | Koishi | .................. | G02F 1/1334 |
| | | | | | 349/196 |
| 2016/0116823 | A1* | 4/2016 | Okura | .................... | G02B 17/04 |
| | | | | | 396/384 |

FOREIGN PATENT DOCUMENTS

JP  2005-338662 A  12/2005
JP  2008-180970 A  8/2008

* cited by examiner

*Primary Examiner* — William Perkey
(74) *Attorney, Agent, or Firm* — Fitzpatrick, Cella, Harper & Scinto (57) ABSTRACT

A camera comprises a display member arranged in a finder optical system. The display member is provided in a finder of the camera and is provided with a reflective prism group including a plurality of reflective prisms and a frame line formed to surround the reflective prism group. A shape forming the frame line is constituted by a convex portion, and a ridge line of the convex portion is in a twisted position with respect to a direction of a ridge line of the reflective prism.

4 Claims, 8 Drawing Sheets

CAMERA HAVING A DISPLAY MEMBER

BACKGROUND OF THE INVENTION

1. Field of the Invention

The present invention relates to a camera having a display member.

2. Description of the Related Art

Conventional cameras have been provided with a finder by which an object in an imaging range is visually recognized and which has a superimposed function providing indexes showing the imaging range, a distance-measuring range and a light-measuring range. Further, in recent years, cameras to which a function for performing most suitable distance-measurement and light-measurement in accordance with situations by setting a plurality of distance-measuring and light-measuring points in a photographing view field is added have been provided. Such cameras notify a photographer the positions of indexes with displaying and non-displaying by switching emitting and non-emitting of the plurality of indexes representing the distance-measuring and light-measuring points in the finder visual field.

However, the conventional superimposed function formed by metal film deposition has had a problem that manufacturing costs are high and quality of visibility is not satisfactory due to occurrence of misalignment of vapor disposition. To attend to the problem, Japanese Patent Application Laid-Open No. 2005-338662 provides a superimposed display method in which a plurality of square frames and a reflective prism group represent positions of distance-measuring and light-measuring points on an optical flat plate, with good visibility and low costs. The reflective prism group is provided with a plurality of reflective prisms on a surface of the optical flat plate opposed to another surface on which the square frames are formed, each reflective prism being formed by a ridge formed by sloped surfaces contacted with each other, sloping in at least two directions, the reflective prism being arranged in such a manner that direction of the ridges thereof being arranged in a same direction.

Further, it is configured that illuminated light from lighting is reflected by a sloped surface to reach a photographer's eye. The reflected light from the reflective prism when lighting is emitted is guided to the photographer's pupil so that the photographer can visually recognize light emission in the finder. On the other hand, when the lighting is not emitted, the photographer can visually recognize as a point a range where the reflective prism group in the finder extends.

On the other hand, to make the photographer recognize an automatic focusing position on the finder, a frame shaped in square or the like is formed on the optical flat plate. For example, it is disclosed that a frame line constituting a frame is shaped in a V-shaped convex in Japanese Patent Application Laid-Open No. 2008-180970. By this structure, light is curved by a sloped surface having the V-shaped convex so that the light does not reach the photographer's eye, thereby the photographer recognizes the V-shaped convex as a black line-like index.

Figure 10A:
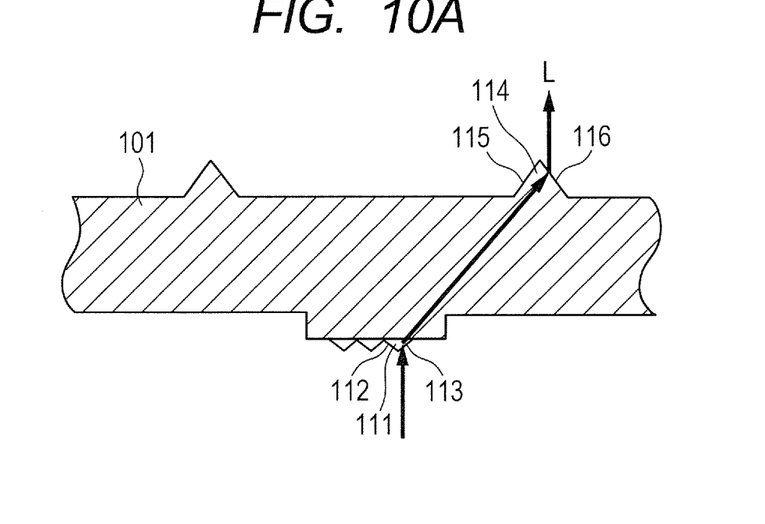
FIG. 10A is a cross sectional view illustrating a frame line and a reflective prism group on the optical flat plate and FIG. 10B is a view illustrating a view field area of a finder.
Figure 10B:
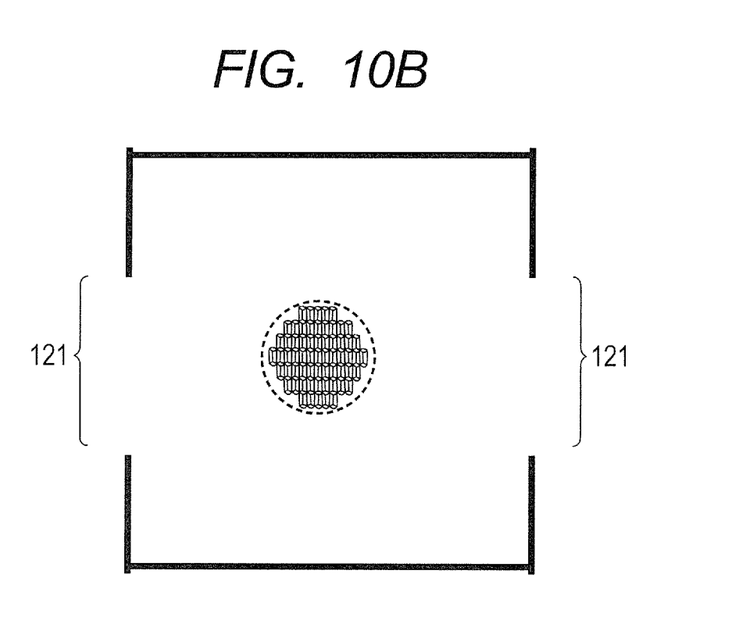

However, there is a problem that a conventional optical flat plate into which Japanese Patent Application Laid-Open No. 2005-338662 and Japanese Patent Application Laid-Open No. 2008-180970 are incorporated together has the flame line inferior in visibility. FIGS. 10A and 10B illustrate a conventional optical flat plate, of which FIG. 10A is a cross sectional view of a frame line and a reflective prism group on an optical flat plate and FIG. 10B is a view illustrating a finder visual field. As illustrated in FIG. 10A, it sometimes occurs that light L from an object is refracted at sloped surfaces 112 and 113 of the reflective prism 111 to pass in the optical flat plate 101, and is refracted at sloped surfaces 115 and 116 of a V-shaped convex 114 to reach a photographer's eye. This phenomenon occurs when a ridge line of the V-shaped convex having a certain height is parallel to a ridge line of the frame line.

FIG. 10B is a view illustrating a frame line in a central region of a right-and-left direction observed in the finder. According to the above-mentioned phenomenon, the light L is guided to the photographer's eye so that an area of the frame line 121 formed by the reflective prism in the frame line is blanked white. Accordingly there has been a problem that a difference in color density in the frame line becomes remarkable so that visibility of the frame line is deteriorated.

SUMMARY OF THE INVENTION

Accordingly, an object of the invention is to provide a display member to be provided in a finder, the display member being excellent in clearness of a frame line acting as an index and in visibility of the index by reducing unevenness of an outer peripheral contour of the frame, to provide a mold processing method for a mold of the frame line of the display member, and to provide a camera using the display member.

Further, an object of the invention is to provide a camera comprising a display member arranged in a finder optical system, wherein said display member is provided in a finder of said camera and is provided with a reflective prism group including a plurality of reflective prisms and a frame line formed to surround said reflective prism group, and wherein a shape forming said frame line is constituted by a convex portion, and a ridge line of said convex portion is in a twisted position with respect to a direction of a ridge line of said reflective prism.

To attain the above-mentioned objects, a display member according to the invention to be provided in a finder of a camera, the display member comprises: a reflective prism group including a plurality of reflective prisms for guiding an illuminated light illuminated from lighting at a focal point detection area by reflection to a photographer's eye; and a frame line configured to surround said reflective prism group so as not to transmit and reflect illuminated light from lighting and light from an object in a direction guided to said photographer's eye, wherein a plurality of conical portions are arranged within a line width of said frame line and a convex portion lower than said conical portions is arranged within said line width at both sides of a line constituted by an arrangement of said conical portions.

Further, to attain the above-mentioned objects, a mold processing method according to the invention of a frame line of a display member to be provided in a camera, comprises: performing a cutting process by rotating a pyramid-shaped tool to a concave shape corresponding to an inversed shape of a conical portion and a convex portion forming said frame line.

Furthermore, to attain the above-mentioned objects, a camera according to the invention comprises a display member arranged in a finder optical system.

Additionally, to attain the above-mentioned objects, a display member according to the invention to be provided in a finder of a camera, comprises: a reflective prism group including a plurality of reflective prisms for guiding an illuminated light illuminated from lighting at a focal point detection area by reflection to a photographer's eye; and a frame line configured to surround said reflective prism group so as not to transmit and reflect illuminated light from lighting and light from an object in a direction guided to said photographer's eye, wherein a shape forming said frame line is configured in a convex portion, and a ridge line of said convex portion is in a twisted position with respect to a direction of ridge line of said reflective prism.

Further, to attain the above-mentioned objects, mold processing method of a frame line of a display member to be provided in a finder of a camera according to the invention, comprises: performing a cutting process by rotating a pyramid-shaped tool to a concave shape corresponding to an inversed shape of a convex portion forming said frame line.

According to the invention, visibility of the superimposed function is not only improved, but density of the frame line is also uniformized to improve visibility of the frame line.

Further features of the present invention will become apparent from the following description of exemplary embodiments with reference to the attached drawings.

BRIEF DESCRIPTION OF THE DRAWINGS

FIGS. 3A and 3B are plane views illustrating a reflective prism in a frame as an index of the optical flat plate illustrated in FIG. 2, of which

FIGS. 5A and 5B are partially enlarged views illustrating the frame as an index at right and left regions of the optical flat plate illustrated in FIG. 2 to explain embodiment 1 of the invention, of which

FIGS. 6A and 6B are partially enlarged views illustrating the frame as an index at right and left regions of the optical flat plate illustrated in FIG. 2 to explain embodiment 2 of the invention, of which

FIGS. 7A and 7B are schematic views illustrating a rotational tool used for forming an optical flat plate, of which

FIGS. 8A and 8B are views illustrating a rotational tool used for the processing apparatus illustrated in FIGS. 7A and 7B, of which

FIGS. 10A and 10B are views illustrating a conventional optical flat plate, of which

DESCRIPTION OF THE EMBODIMENTS

A display member in a finder according to each embodiment of the invention will be explained in detail with reference to accompanying drawings. It is noted that values described in following embodiments are reference numerical values and it is needless to say that the invention is not limited thereto in any sense.

Figure 1:
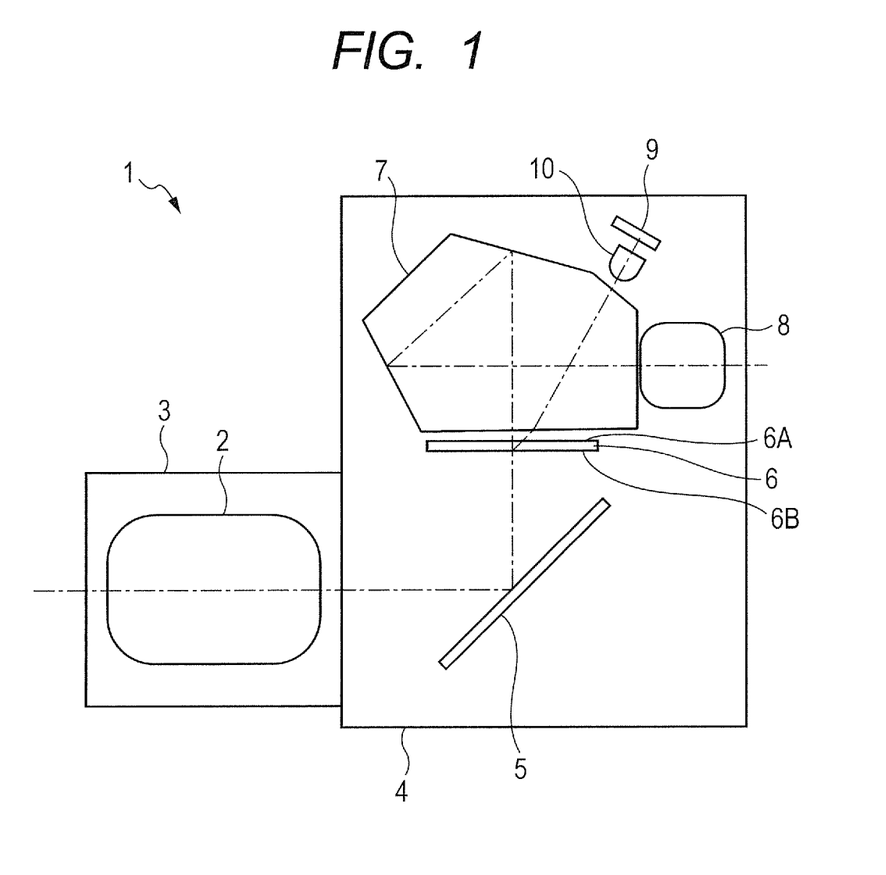
FIG. 1 is a schematic view illustrating a configuration of an optical system of a single lens reflex camera provided with an optical flat plate as a display member provided in a finder according to each of embodiments of the invention.

FIG. 1 is a schematic view illustrating a configuration of an optical system of a single lens reflex camera provided with an optical flat plate 6 as a display member provided in a finder (finder optical system) according to each of embodiments of the invention.

An object image generated by light from an object not illustrated passes a lens mirror barrel 3 including a photographing optical system 2, is reflected by a quick return mirror 5 in a camera body 4 and is imaged on the optical flat plate 6. The lens mirror barrel 3 is removably mounted on or integrated with a camera body 4. At the rear of the quick return mirror 5 (in a direction where light linearly advances from the photographing optical system), a silver salt film, a solid state imaging element (a CCD or CMOS sensor) or the like is arranged.

The quick return mirror 5 is rotated interlockingly with a release of the camera so as to switch between a photographing optical path and a finder optical path. An image forming is made by light reflected upwardly at the quick return mirror 5. A fresnel surface is formed at a lower surface 6B of the optical flat plate 6 and a mat surface is formed at an upper surface 6A of optical flat plate, which is called a focus plate, a focusing screen or the like.

An object image formed on the optical flat plate 6 is formed as an erect positive image and guided to a photographer's pupil not illustrated through an eyepiece 8. In this case, the object image is visually recognized by the photographer with a point and a frame in the finder by the optical flat plate 6 as a display member including a plurality of reflective prism groups and square frames representing positions of distance-measuring and light-measuring points displayed in the finder.

Further, a reason why the photographer can notice positions of distance-measuring and light-measuring points is that light reflected by the reflective prism groups formed at a lower surface of optical flat plate 6 is guided to the photographer's pupil through a pentagonal roof prism 7 and the eyepiece 8 with an object image.

Light illuminated (reflected) from lighting at a focal point detection area is illumination light emitted from an illuminated light source 9, and the illumination light passes on a path on which the light illuminates obliquely the optical flat plate 6 from a short side direction of a photographing view field in a plane including an optical axis of illumination optical system 2 through illuminated optical system 10 and the pentagonal roof prism 7. It is noted that a direction of short side denotes a right and left direction in FIG. 1, an up-and-down direction of the optical flat plate, and an up-and-down direction in the finder visual field in FIG. 2 to be mentioned later.

Figure 2:
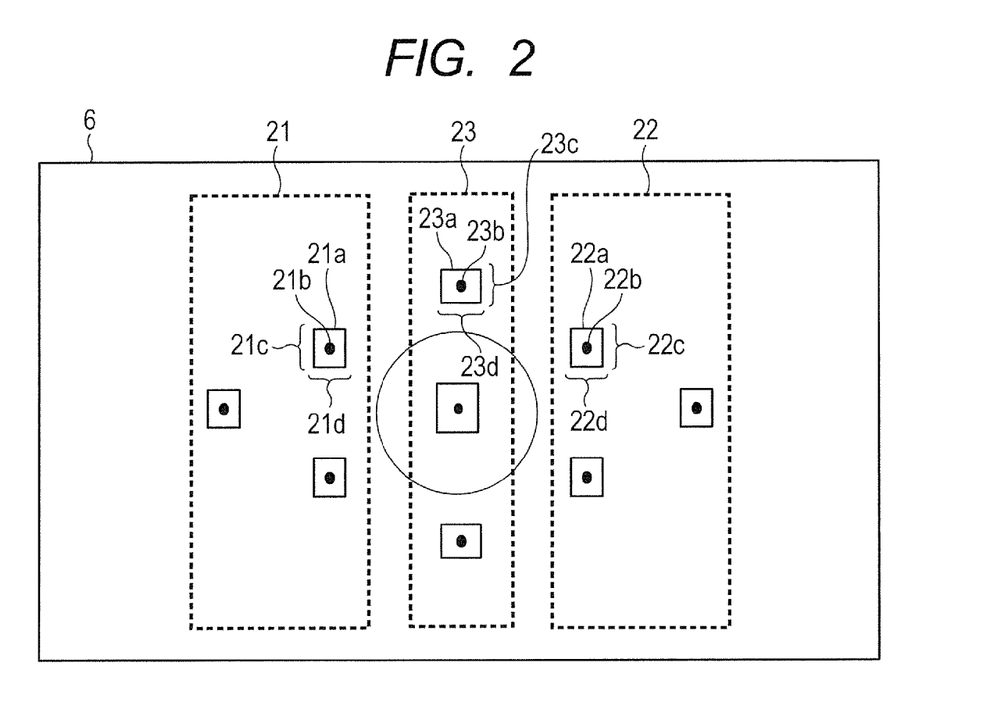
FIG. 2 is a view illustrating an optical flat plate of a camera in each of embodiments of the invention.

FIG. 2 is a view illustrating the optical flat plate 6 of the camera 1 in each of embodiments of the invention.

The optical flat plate 6 is provided with a left peripheral region 21, a right peripheral region 22 and a central region 23 arranged therebetween. In the left peripheral region 21, frames 21a each constituted by a frame line 21c and a frame line 21d are formed as indexes at three places. Further, in the right peripheral region 21, frames 22a each constituted by a frame line 22c and a frame line 22d are also formed as indexes at three places. Each frame line is configured to prevent light from the object and illuminated light illuminated from the lighting from transmitting and reflecting in a direction guided to a photographer's eye.

Furthermore, in the central region 23, frames 23a each constituted by a frame line 23c and a frame line 23d are formed as indexes at three places. Accordingly, the frames 21a, 22a and 23a are formed at nine places in total. Moreover, reflective prism groups 21b, 22b and 23b are formed as indexes at nine places in total on a surface of the optical flat plate 6 opposed to the frames 21a, 22a and 23a and in centers of the frames 21a, 22a and 23a.

Figure 3A:
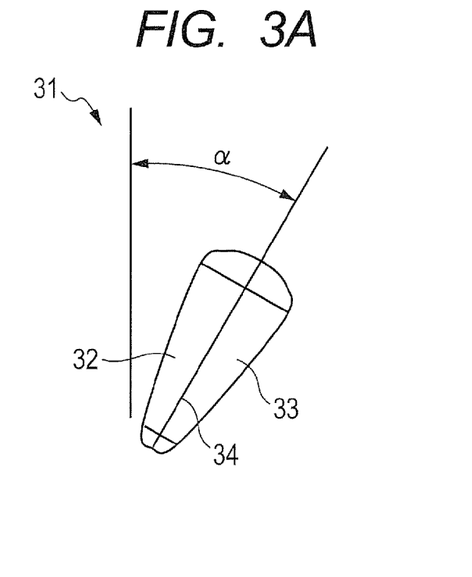
FIG. 3A illustrates the reflective prism at right and left regions of the optical flat plate illustrated in FIG. 2.

FIGS. 3A and 3B illustrate a reflective prism. A reflective prism group 21b is provided with a plurality of reflective prisms 31, each of which is constituted by sloped surfaces 32 and 33 sloping in two directions and a ridge line 34 formed by the sloped surfaces contacted with each other and each of which is arranged in such a manner that the ridge line 34 is inclined to the frame line 21c at an angle of a as illustrated in FIG. 3A.

On the other hand, the reflective prism group 22b is provided with a plurality of reflective prisms 31, each of which is arranged to be inclined to the frame line 22c at an angle of a in a direction opposed to the reflective prism group 21b as illustrated in FIG. 3A.

Figure 3B:
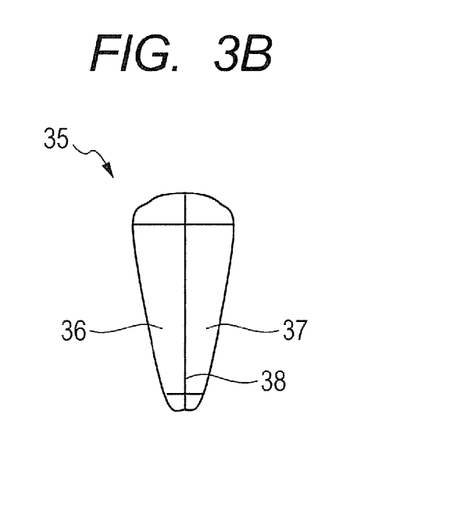
FIG. 3B is a reflective prism at a central region of the optical flat plate illustrated in FIG. 2.

A reflective prism group 23b is provided with a plurality of reflective prisms 35, each of which is constituted by sloped surfaces 36 and 37 sloping in two directions and a ridge line 38 formed by the sloped surfaces contacted with each other and each of which is arranged in such a manner that the ridge line 38 is parallel to the frame line 23c as illustrated in FIG. 3B.

Figure 4:
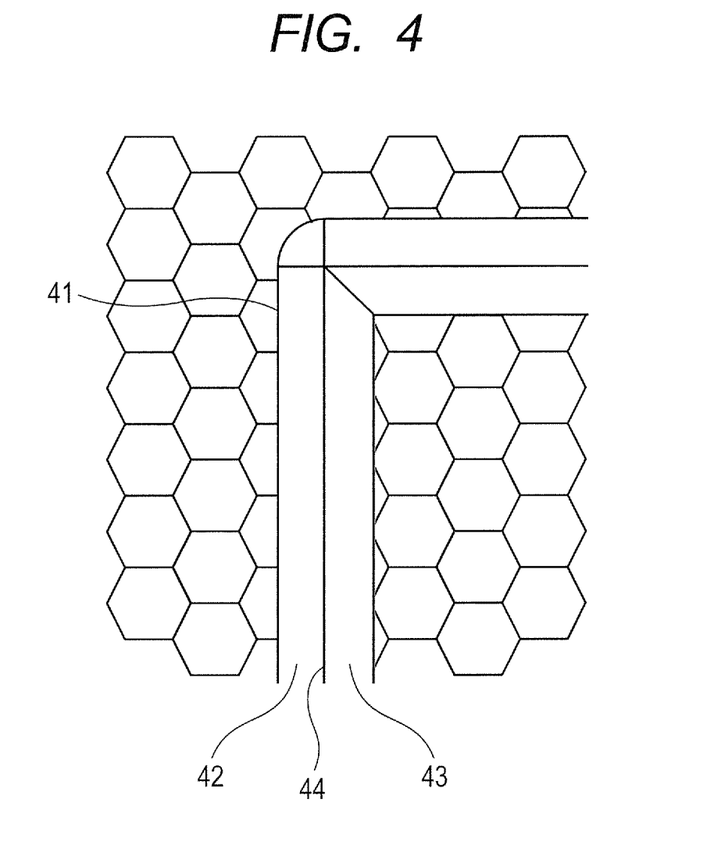
FIG. 4 is a partially enlarged view illustrating the frame as an index at right and left regions of the optical flat plate illustrated in FIG. 2.

FIG. 4 is a partially enlarged view illustrating frames 21a and 22a and a convex portion 41 having a V-shaped cross section constituted by a sloped surface 42, a sloped surface 43 and a ridge surface formed by connecting the sloped surfaces with each other on a mat surface that is a surface 6A of the optical flat plate 6 illustrated in FIG. 2.

The ridge line 44 of the convex portion 41 of frame line 21c is not in parallel with the ridge line 34 of the reflective prism 31 so that on the finder, light coming from the object through a lens and the optical flat plate 6 is bent by the sloped surface 42 and the sloped surface 43 of convex portion 41 not to reach the photographer's eye and the photographer can recognize the convex portion 41 as a black line-like index.

Similarly, the ridge line 44 of convex portion 41 of frame line 22c is also not in parallel with a ridge line 34 of the reflective prism 31 so that on the finder, light coming from the object through the lens and the optical flat plate 6 is bent by sloped surface 42 and the sloped surface 43 of the convex portion 41 not to reach a photographer's eye and the photographer can recognize the convex portion 41 as a black line-like index.

On the other hand, the ridge line 38 of reflective prism 35 of the reflective prism group 23b formed in the frame 23a is parallel to the frame lines 21c and 22c. Accordingly, when the frame line 23c is shaped in a V-shaped convex portion having a certain height like the frame lines 21c and 22c illustrated in FIG. 4, light from the object refracted by the sloped surfaces 36 and 37 of the reflective prism 35 to pass in the optical flat plate 6, and is refracted by the sloped surfaces 42 and 43 of the convex portion 41 to happen to reach the photographer's eye. Then, an area where the reflective prism 35 of the frame line 23c is generated generates a white void by such phenomenon, thereby causing a difference in density of frame line in the frame line 23c to have the frame line inferior in clearness.

Accordingly, in the optical flat plate 6 of the invention, a shape of frame line 23c of frame 23a is constituted by a plurality of conical portions and convex portions having a lower height. With such a configuration, when the photographer views the frame line 23c through the finder, a difference in density in the frame line 23c disappears to improve visibility.

Embodiment 1

Figure 5A:
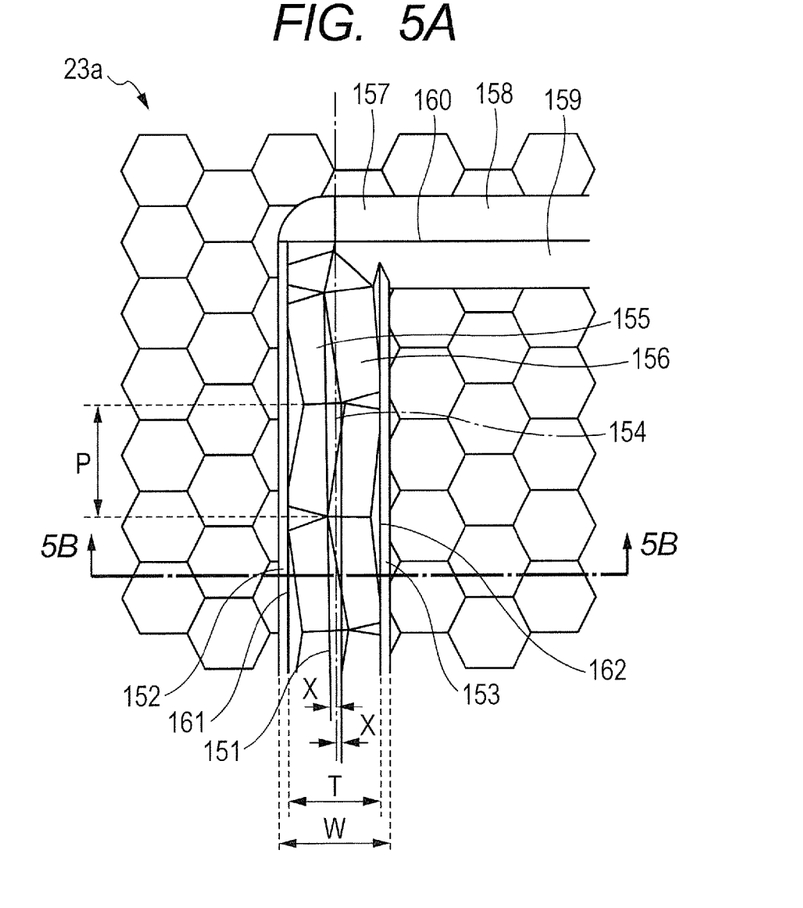
FIG. 5A is a plan view and FIG. 5B is a cross sectional view taken along a line 5B-5B of FIG. 5A.
Figure 5B:
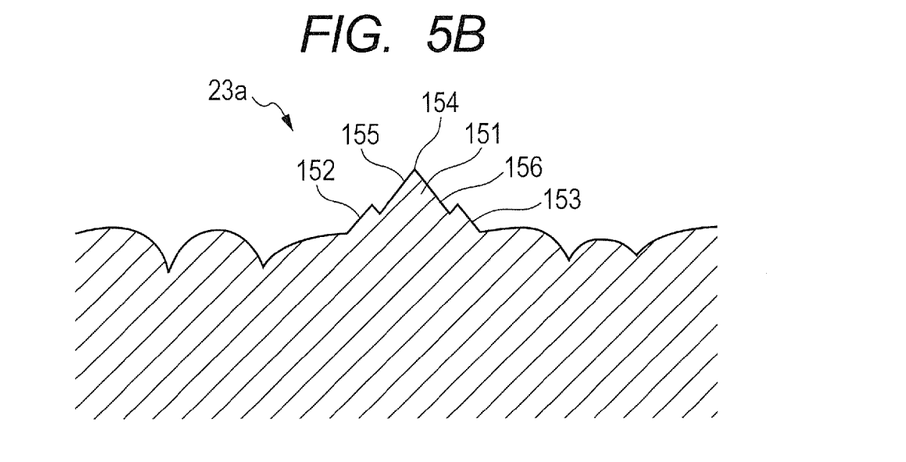

Explanation as to a configuration of the frame line 23c and the frame line 23d according to embodiment 1 of the invention will be explained. FIG. 5A is a plain view illustrating a part of four corners of the frame 23a constituted by the frame line 23c and the frame line 23d. FIG. 5B is a cross sectional view taken along a line 5B-5B of the frame line 23c.

The frame line 23d is formed by a frame line 157 of a convex portion constituted by a sloped surface 158 and a sloped surface 159 through a ridge line 160. The ridge line 160 is formed to extend in a direction orthogonal to a ridge line 38 of reflective prism 35 on a surface of optical flat plate 6.

On the other hand, the frame line 23c is formed by a frame line 151 of convex portion having a V-shaped cross section, and a convex portion 152 and a convex portion 153 formed along a contour of frame line 151. The frame line 151 of the convex portion is formed by a sloped surface 155 and a sloped surface 156 through the ridge line 154, and formed in such a shape extending with a shift amount X in a right and left direction with respect to a central standard and having a width T of the convex portion at every pitch P within a line width W of the frame line 23c. It is noted that the width T occupies more than half of the line width in the line width W of frame line 23c and a following formula (1) is satisfied.

$$W = T + 2 \times X \tag{1}$$

Further, the frame line 23c is formed by the convex portion 152 and the convex portion 153 both having heights lower than that of frame line 151 so as to fill up unevenness of a frame line contour formed by the frame line 151 and have the line width W of the frame line 23c. The convex portion 152 and the convex portion 153 are formed in such a manner that the ridge line 161 of the convex portion 152 and the ridge line 162 of convex portion 153 extend in a direction same as the ridge line 38 of the reflective prism 35 on a surface of optical flat plate 6.

As explained above, according to embodiment 1 of the invention, the ridge line 154 of the frame line 151 of convex portion is formed at every pitch P with the shift amount X, namely, is in a twisted positional relation with the ridge line 38 of the reflective prism 35. With such a configuration, the light from the object is bent by the sloped surface 155 and the sloped surface 156 of the frame line 23c not to reach the photographer's eye, thereby the photographer can recognize the frame line 23c as a black line with the difference in density being reduced.

Moreover, the contour of unevenness of the frame line 151 is constituted by the above-mentioned convex portions 152 and 153 so that the unevenness of the contour of the outer circumference of the frame line 23c disappears and the photographer can recognize the frame excellent in visibility.

Embodiment 2

Figure 6A:
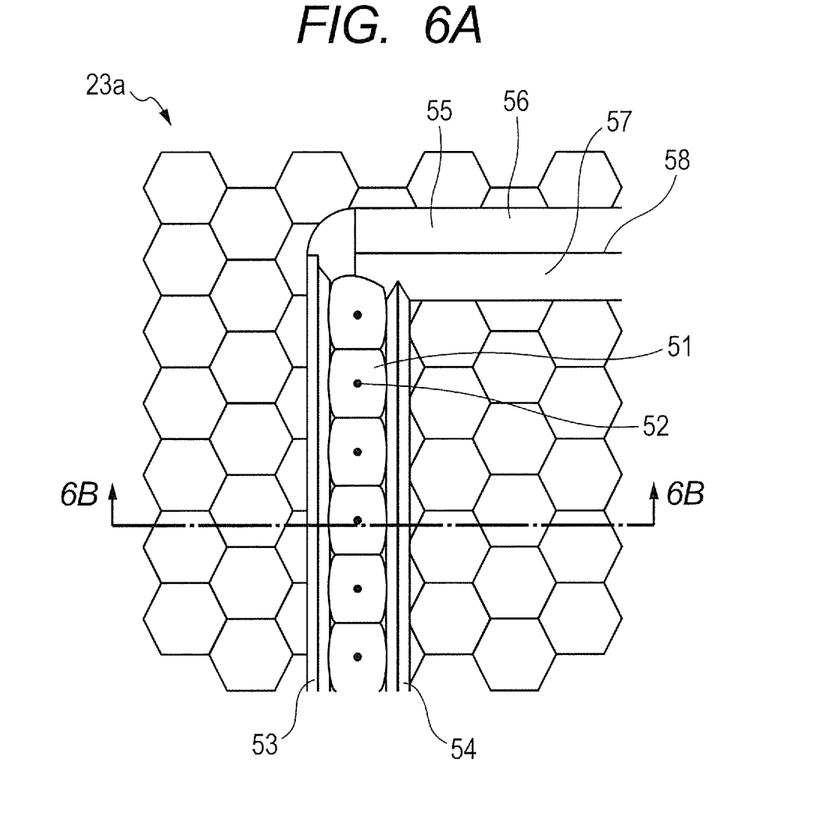
FIG. 6A is a plan view and FIG. 6B is a cross sectional view taken along a line 6B-6B of FIG. 6A.
Figure 6B:
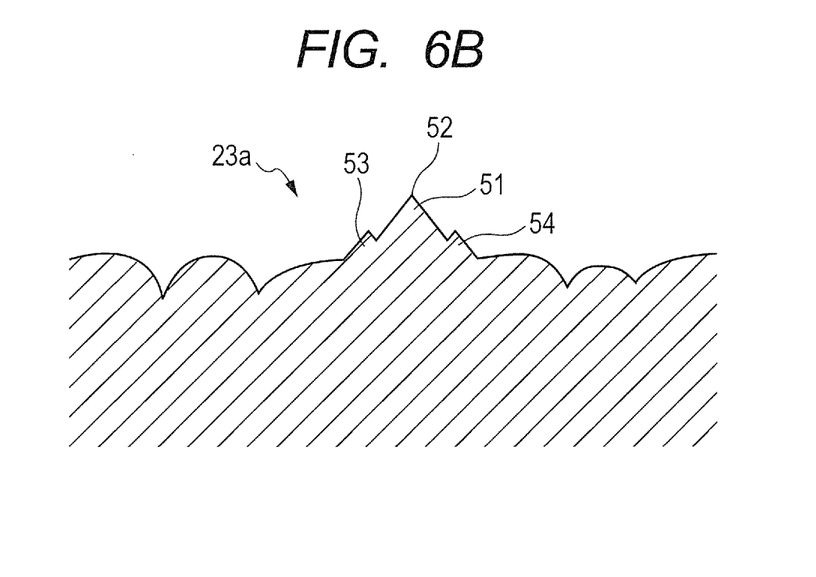

The configuration of frame lines 23c and 23d according to embodiment 2 of the invention will be explained in detail. FIG. 6A is a plan view illustrating a part of four corners of frame 23a constituted by the frame lines 23c and 23d and FIG. 6B is a cross sectional view taken along a line 6B-6B of FIG. 6A. The frame line 23c is formed by a plurality of conical portions 51 and convex portions 53 and 54 having a V-shaped cross section. A plurality of conical portions 51 are formed at a certain pitch so as to be settled within the width size of the frame line 23c.

Further, the convex portions 53 and 54 are formed so as to extend within a line width (width size) of the frame line 23c at both right and left sides (both sides of line constituted by the arrangement of the conical portions 51) with respect to the conical portions 51. Furthermore, heights of the convex portions 53 and 54 are lower than those of apexes 52 of the conical portions 51 as illustrated in FIG. 6B. Therefore, the frame line 23c is provided with no ridge line having a predetermined height and parallel to the ridge line 38 of reflective prism 35.

On the other hand, the frame line 23d is formed by a convex portion 55 having a V-shaped cross section constituted by a sloped surface 56, a sloped surface 57 and a ridge line 53 formed by connecting the sloped surfaces with each other, since the ridge line 58 of the frame line 23d is not parallel to the ridge line 38 of the reflective prism 35.

As a result of the above, light from an object is prevented from bending by the conical portions 51 of the frame line 23c and reaching a photographer's eye so that the photographer can recognize the frame line 23c as a black line.

Figure 7A:
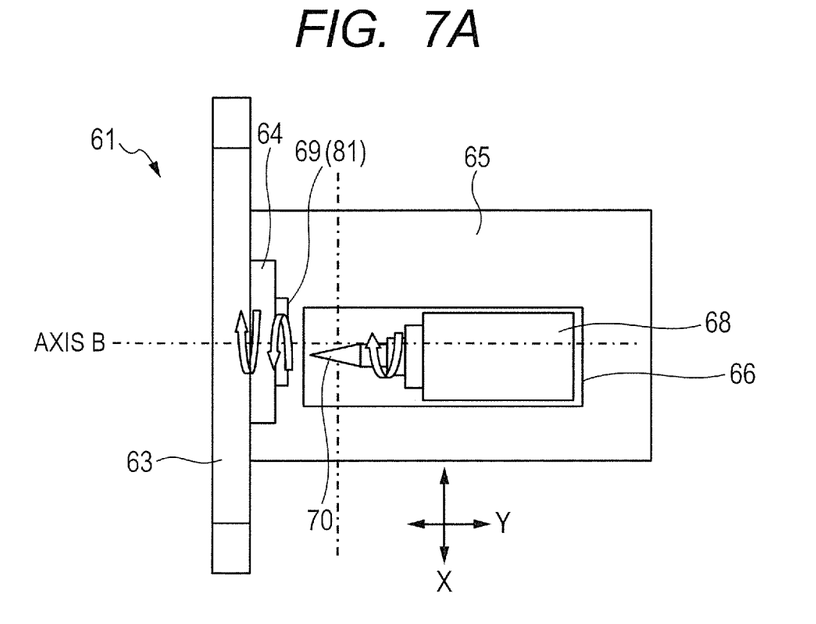
FIG. 7A is a plan view and FIG. 7B is a front view.
Figure 7B:
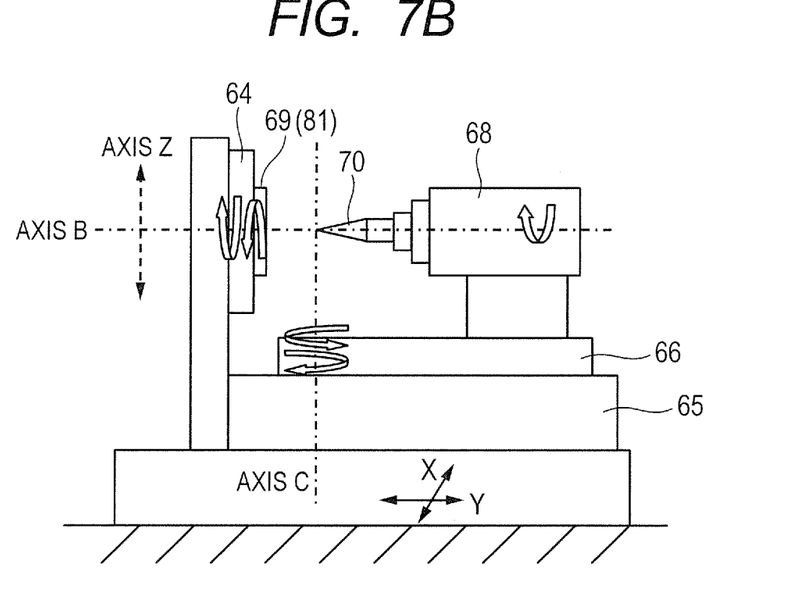
Figures 8A, 8B:
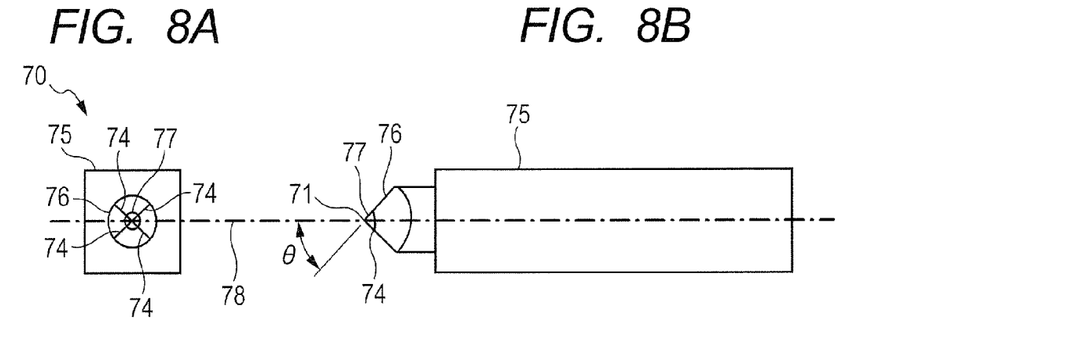
FIG. 8A is a view illustrating the rotational tool viewed from a chip side and FIG. 8B is a front view.

Next, a mold processing method of a mold 81 (see FIG. 9C.) for forming a frame line required to form a display member in a finder of the invention will be explained with reference to FIGS. 7A and 7B, and FIGS. 8A and 8B. FIGS. 7A and 7B are schematic views illustrating a processing apparatus 61 for manufacturing the mold 81, of which FIG. 7A is a plan view and FIG. 7B is a front view. FIGS. 8A and 8B are views illustrating a rotational tool 70 used for the processing apparatus illustrated in FIGS. 7A and 7B, of which FIG. 8A is a view illustrating a rotational tool viewed from a chip side and FIG. 8B is a front view.

The processing apparatus 61 is a five-axis NC processing apparatus that is provided with three-directional linear motion positioning axes orthogonal to each other including an XY slider 65 and a Z slider 63 and two rotational positioning axes including a B-axis rotational apparatus 64 and a C-axis rotational apparatus 66.

The rotational tool 70 for performing a cutting process is mounted on a rotational spindle 63 fixed on the C-axis rotation apparatus 66 is adapted to rotate at a high speed. Further, a workpiece 69 to be the mold 81 is fixed on the B-axis rotational apparatus.

The rotational tool 70 illustrated in FIGS. 8A and 8B is constituted by a shank portion 75 mounted on the rotational spindle (see FIGS. 7A and 7B.) and a cutting edge portion 76. A chip 77 formed of a single crystal diamond is brazed to an edge portion of a cutting edge portion 76 to form a cutting edge. The chip 77 is polished in a quadrangular pyramid shape to form four cutting edge ridge lines 74. The four cutting edge ridge liens 74 are formed in rotation symmetry with respect to a tool central axis 78 passing an apex of the quadrangular pyramid. Further, a vertical angle θ formed by the cutting edge ridge lines 74 and the tool central axis 78 is set to ½ of edge angles of cross sections of the convex portions 41, 53, 54 and 55 and the conical portion 51.

Next, a procedure to manufacture a mold 81 for forming the frames 21a, 22a and 23a on the workpiece 69 by using the processing apparatus 61 and the rotational tool 70 will be explained.

First, the workpiece 69 is oriented in the Z-axis direction and is mounted on the B-axis rotation apparatus 64.

Next, deflection of the rotational tool 70 is adjusted and mounted on the rotational spindle 68 in such a manner that an apex 71 of the quadrangular pyramid at the tip of the rotational tool 70 and the tool central axis 78 of rotational tool 70 coincide with a rotational central axis of the rotation spindle 68.

After completion of the above adjustment, the rotational tool 70 is rotated at a predetermined rotational number by the rotation spindle 68 and the apex 71 is aligned with a position where an inversed (inverted) shape of the convex portion 41 of the frame lines 21c and 21d can be processed, by using the X-axis and the Z-axis. Next, the apex 71 of the rotational tool 70 is scanned by using the Y-axis and Z-axis, and the workpiece 69 is formed in a concave-like inversed shape of the convex portion 41. An inversed shape of the convex portion 41 of the frame lines 22c and 22d and the convex portion 55 of the frame line 23d is formed by the rotational tool 70 by the similar method.

Subsequently, the apex 71 of the rotational tool 70 is aligned with a position where the inversed shape of frame line 23c can be processed. Next, the apex 71 of rotational tool 70 is moved in the Y-axis direction (toward the workpiece) to perform cutting and is retuned in an opposite direction of the Y-axis. The above process is repeated by using the Y-axis and the Z-axis to form an inversed shape of the plurality of conical portions 51 spaced away at a predetermined pitch on the workpiece 69. Lastly, the inversed shape of convex portions 53 and 54 is processed at the both sides of the conical portions 51, so as to have a cutout shallower than the apexes 52 of the conical portions 51.

As described above, the inversed shape of the frames 21a and 22a constituted by the convex portion 41 and the frame 23a constituted by the convex portions 53, 54 and 55 and the conical portions 51 is formed. As a result of this, the workpiece 69 becomes the mold 81.

As described above, the mold 81 is continuously processed by a single rotational tool so that processing accuracy is improved and processing time is shortened.

Next, a manufacturing method of the optical flat plate 6 will be explained. FIGS. 9A, 9B, 9C and 9D are simplified schematic views illustrating a manufacturing process.

Figure 9A:
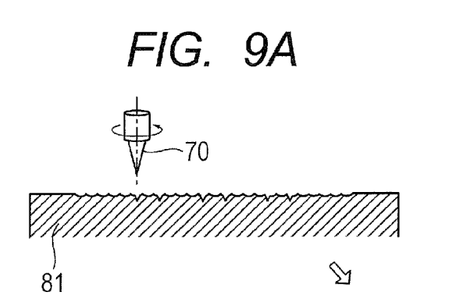
FIGS. 9A, 9B, 9C and 9D are schematic views to explain a method for manufacturing the optical flat plate illustrated in FIG. 2.

First, a mold including a mat surface is continuously cut by the above-mentioned mold processing method so as to have an inversed shape of the convex portions 41, 53, 54 and 55, and the conical portions 51 of the optical flat plate with the single rotational tool 70 mentioned above to manufacture the mold 81.

Figure 9B:
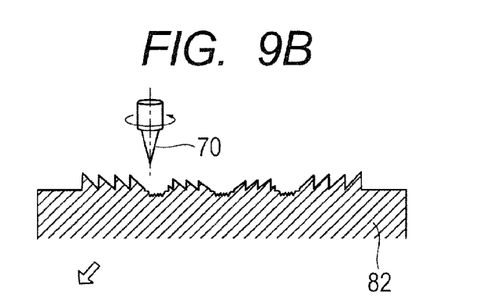

Next, an inversed shape of the reflective prisms 31 and 35 of the optical flat plate 6 is carved on a mold provided with a fresnel surface to manufacture the mold 82.

Figure 9C:
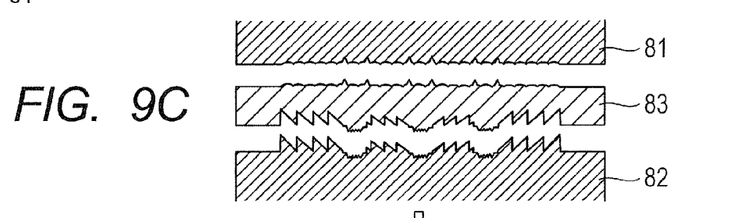

Subsequently, the manufactured molds 81 and 82 are used to perform plastic molding by injection molding or the like, as illustrated in FIG. 9C.

Figure 9D:
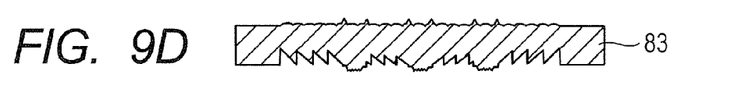

Finally, a plastic formed article 83 is separated from the molds 81 and 82 as illustrated in FIG. 9D. The separated plastic formed article 83 is to be the optical flat plate 6 on which the frames 21a, 22a and 23a, and the reflective prism group 21b, 22b and 23b are formed. In this way, formation of the optical flat plate 6 is completed.

A shape and a size of frame line of optical flat plate 6 that is a display member provided in the finder according to embodiment 2 and manufactured by the processing apparatus and the processing method mentioned above are as follows. Further, the ultraprecision five-axis processing apparatus as illustrated in FIGS. 7A and 7B and a quadrangular pyramid diamond tool having a 35 degree of vertical angle θ illustrated in FIGS. 8A and 8B were utilized to continuously perform a cutting process of mold of frame line with a single tool. From the mold, a plastic formed article, namely, display member is obtained by injection molding from the mold.

Table 1 shows each size of frame line of the optical flat plate 6. The frame line is formed by a plurality of conical portions and convex portions. The plurality of conical portions are formed to extend within the frame line being 30 μm in width size thereof. Further, the convex portions are formed at right and left sides with respect to the conical portions to extend within the frame line being 30 μm in width size thereof.

TABLE 1

| Entire Frame Line | Line Width (μm) | 30 |
|---|---|---|
|  | Size (mm²) | 0.9478 × 0.9478 |
| Conical Portion | Diameter (mm) | 25 |
|  | Tip Angle (°) | 70 |
|  | Pitch (μm) | 20 |
| Convex Portion (Formed at Right and Left of Conical Portion) | Tip Angle (°) | 70 |
|  | Height (μm) | 8 |

The frame line of the optical flat plate 6 that was a formed article manufactured by the above mentioned method had no difference in color density that a frame line of the prior art exhibited, and obtained excellent visibility.

On the other hand, the display member of embodiment 1 has nine frames as shown in FIG. 2. Table 2 shows a specification of frame of display member according to embodiment 1.

Each frame is different in size from other frames according to a region as shown in Table 2. A line width of the frame line constituting the frame corresponds to the line width W illustrated in FIG. 5A and line widths of all the frames are 30 μm.

TABLE 2

| Frame | Size (mm²) | 0.9478 × 0.9478 (Center Frame of Central Region) |
|---|---|---|
|  |  | 0.5366 × 07272 (Right and Left Regions) |
|  |  | 0.7673 × 0.4965 (Upper and Lower Frames of Central Region) |
| Frame Line | Line Width (μm) | 30 |
| Convex Portion (Principal Portion in Frame) | Tip Angle (°) | 70 |
|  | Pitch (μm) | 30 |
|  | Width T (μm) | 25 |
|  | Shift Amount X (μm) | 2.5 |
| Contour Convex Portion (Formed at Right and Left of Principal Portion Convex portion) | Tip Angle (°) | 70 |
|  | Height (μm) | 8 |

The primary convex portions in the frame line constitute a zigzag-shaped frame line with a tip angle of 70 degrees and a width T of 25 μm, at a pitch P of 30 μm and with a shift amount X of 2.5 μm, so as to extend within the frame line being 30 μm in frame line width W as illustrated in FIG. 5A. Further, the convex portions are formed at the right and left contours of frame lines of the convex portions with an edge angle of 70 degrees and at a height of 8 μm, so as to extend within the frame line being 30 μm in frame line width W similarly.

Further, the ultraprecision five-axis processing apparatus as illustrated in FIGS. 7A and 7B and a quadrangular pyramid diamond tool having a vertical angle θ of 35 degrees illustrated in FIGS. 8A and 8B were utilized to continuously perform a cutting process of mold of the frame line with a single tool. From the mold, a plastic formed article, namely, display member is obtained by injection molding from the mold.

As mentioned above, by using the display member manufactured by the invention, a difference in color density that a frame line of the prior art exhibited disappeared and density of the frame line was uniformized. As a result, the photographer can visually recognize a frame as an index excellent in visibility in the finder.

Although, in each embodiment mentioned above, the chip 77 provided on the edge of cutting edge portion 76 of the rotational tool 70 is polished in the quadrangular pyramid shape, it may be shaped in another polygonal pyramid such as a trigonal pyramid or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-215080, filed Oct. 22, 2014, and Japanese Patent Application No. 2014-215225, filed Oct. 22, 2014, which are hereby incorporated by reference herein in their entirety.

What is claimed is:

1. A camera comprising a display member arranged in a finder optical system,
    wherein said display member is provided in a finder of said camera and is provided with a reflective prism group including a plurality of reflective prisms and a frame line formed to surround said reflective prism group, and
    wherein a shape forming said frame line is constituted by a convex portion, and a ridge line of said convex portion is in a twisted position with respect to a direction of a ridge line of said reflective prism.

2. The camera according to claim 1, wherein said display member is an optical plate provided in said finder.

3. A camera comprising a display member arranged in a finder optical system,
    wherein said display member is provided with a reflective prism group including a plurality of reflective prisms and a frame line formed to surround said reflective prism group, and
    wherein a plurality of conical portions are arranged within a line width of said frame line and a convex portion lower than said conical portions is arranged within said line width at both sides of a line constituted by an arrangement of said conical portions.

4. The camera according to claim 3, wherein said display member is an optical plate provided in said finder.

* * * * *